United States Patent
Fainzilber et al.

(10) Patent No.: US 10,379,940 B2
(45) Date of Patent: Aug. 13, 2019

(54) PIPELINE DELAY DETECTION DURING DECODING BY A DATA STORAGE DEVICE

(71) Applicant: SANDISK TECHNOLOGIES LLC, Plano, TX (US)

(72) Inventors: Omer Fainzilber, Even Yehuda (IL); Ariel Navon, Revava (IL); Alexander Bazarsky, Holon (IL); David Gur, Ofra (IL); Stella Achtenberg, Netanya (IL)

(73) Assignee: SANDISK TECHNOLOGIES LLC, Addison, TX (US)

( * ) Notice: Subject to any disclaimer, the term of this patent is extended or adjusted under 35 U.S.C. 154(b) by 4 days.

(21) Appl. No.: 15/372,485

(22) Filed: Dec. 8, 2016

(65) Prior Publication Data

US 2018/0165150 A1    Jun. 14, 2018

(51) Int. Cl.
*G06F 11/10*    (2006.01)

(52) U.S. Cl.
CPC ...... *G06F 11/1016* (2013.01); *G06F 11/1012* (2013.01)

(58) Field of Classification Search
CPC .................................................. G06F 11/1016
See application file for complete search history.

(56) References Cited

U.S. PATENT DOCUMENTS

| | | | |
|---|---|---|---|
| 6,212,611 B1 | 4/2001 | Nizar et al. | |
| 7,733,703 B2 | 6/2010 | Li | |
| 9,268,635 B2 | 2/2016 | Sharon et al. | |
| 2005/0138520 A1* | 6/2005 | Richardson | H03M 13/1111 714/755 |
| 2007/0011573 A1* | 1/2007 | Farjadrad | H03M 13/1102 714/760 |
| 2013/0242652 A1* | 9/2013 | Maccarrone | G11C 11/5628 365/185.03 |
| 2016/0011934 A1* | 1/2016 | Hsu | G06F 11/1012 714/764 |
| 2016/0179620 A1 | 6/2016 | Bazairsky et al. | |
| 2016/0197623 A1* | 7/2016 | Varanasi | G11C 11/5621 714/764 |
| 2017/0093439 A1* | 3/2017 | Motwani | H03M 13/45 |
| 2017/0294217 A1* | 10/2017 | Lin | G11C 7/00 |

OTHER PUBLICATIONS

Goldenberg et al., "Method and Data Storage Device to Estimate a Number of Errors Using Convolutional Low-Density Parity-Check Coding," U.S. Appl. No. 15/265,045, filed Sep. 14, 2016, 58 pages.
Sharon et al., "Soft Bit Techniques for a Data Storage Device," U.S. Appl. No. 14/823,747, filed Aug. 11, 2015, 56 pages.

* cited by examiner

*Primary Examiner* — Thien Nguyen
(74) *Attorney, Agent, or Firm* — Michael Best & Friedrich LLP

(57) ABSTRACT

A method of operation of a data storage device includes inputting data to a decoder of the data storage device. The method further includes sending a command to a memory of the data storage device in response to an indication of a pipeline delay associated with a decoding process to decode the data. The command indicates an operation to be performed at the memory to in response to the pipeline delay.

20 Claims, 5 Drawing Sheets

PIPELINE DELAY DETECTION DURING DECODING BY A DATA STORAGE DEVICE

FIELD OF THE DISCLOSURE

This disclosure is generally related to electronic devices and more particularly to data storage devices.

BACKGROUND

Data storage devices enable users to store and retrieve data. Examples of data storage devices include volatile memory devices and non-volatile memory devices. A non-volatile memory may retain data after a power-down event, and a volatile memory may lose data after a power-down event.

In some cases, data read from a data storage device may be subject to one or more errors. For example, electrical noise may cause a logic "0" value to be read as a logic "1" value (or vice versa).

To enable correction of data errors, a data storage device may encode data using an encoding scheme, such as by adding redundancy information to the data prior to storing the data to a memory of the data storage device. The encoding scheme may specify a codebook that associates data with codewords of the encoding scheme. Upon reading the data, the data storage device may decode the data by using the redundancy information to locate and correct one or more data errors (up to a particular error correction capability of the encoding scheme).

In some circumstances, decoding of data may create latency in read operations. For example, a decoder may use an iterative decoding process to locate data errors, and a large number of errors may create a "bottleneck" condition that slows processing of other data, resulting in latency.

DETAILED DESCRIPTION

A data storage device in accordance with aspects of the disclosure is configured to predict or detect a pipeline delay in connection with a decoding process performed to decode data at the data storage device. To illustrate, the data storage device may be configured to detect that a duration of the decoding process satisfies a threshold. Alternatively or in addition, the data storage device may be configured to predict (or detect) the pipeline delay based on a syndrome weight associated with the data, based on a number of flipped bits associated with the data, based on a decoding mode change during the decoding process, based on one or more other conditions, or a combination thereof.

In response to predicting the pipeline delay, the data storage device may send a command to a memory of the data storage device. The command may indicate data to be read, a read technique (e.g., a soft bit technique) to be used to read data, another operation (e.g., a read threshold calibration operation), or a combination thereof. In some cases, the command is executed during performance of the decoding process.

By sending the command in response to predicting the pipeline delay, the data storage device may increase throughput at a pipeline of the data storage device (e.g., by reducing or avoiding instances of "stall" at the pipeline). For example, by executing the command during performance of the decoding process, throughput may be increased as compared to waiting until the decoding process is completed to initiate another memory operation.

Particular aspects of the disclosure are described below with reference to the drawings. In the description, common or similar features may be designated by common reference numbers. As used herein, "exemplary" may indicate an example, an implementation, and/or an aspect, and should not be construed as limiting or as indicating a preference or a preferred implementation.

Figure 1:
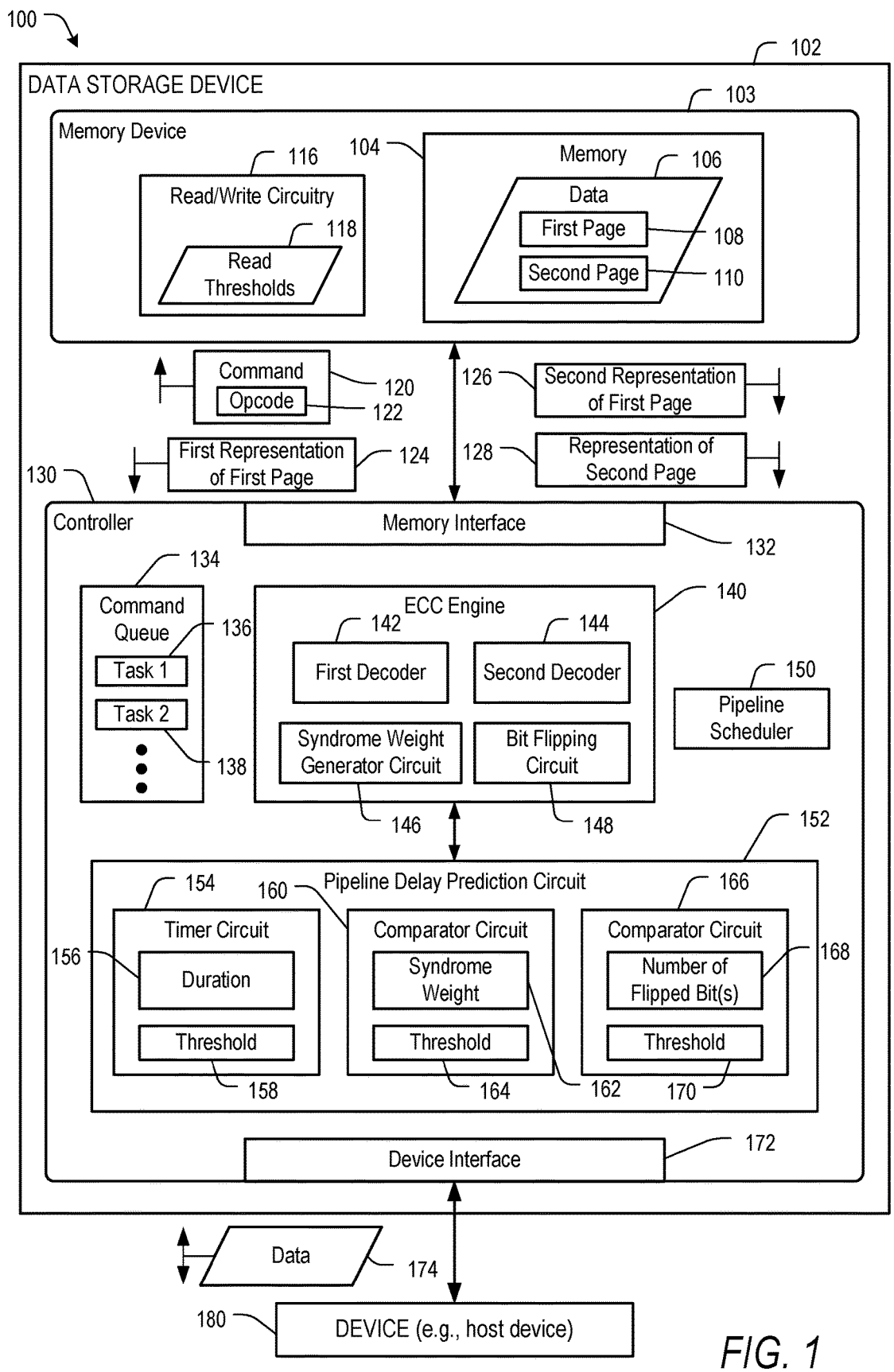
FIG. 1 is a diagram of a particular illustrative example of a system including a data storage device that includes a circuit configured to detect a pipeline delay at the data storage device.

Referring to FIG. 1, a particular illustrative example of system is depicted and generally designated 100. The system 100 includes a data storage device 102 (e.g., an apparatus) and a device 180 (e.g., a host device or an access device). The data storage device 102 includes a memory device 103 (e.g., one or more memory dies) and a controller 130. The controller 130 is coupled to the memory device 103. In some implementations, the data storage device 102 is integrated within the device 180, such as in connection with a solid-state drive (SSD) implementation.

The memory device 103 includes read/write circuitry 116 and a memory 104, such as a non-volatile array of storage elements included in one or more memory dies. The memory 104 may include a flash memory (e.g., a NAND flash memory) or a resistive memory, such as a resistive random access memory (ReRAM), as illustrative examples. The memory 104 may have a three-dimensional (3D) memory configuration. As used herein, a 3D memory device may include multiple physical levels of storage elements (instead of having a single physical level of storage elements, as in a planar memory device). As an example, the memory 104 may have a 3D vertical bit line (VBL) configuration. In a particular implementation, the memory 104 is a non-volatile memory having a 3D memory array configuration that is monolithically formed in one or more physical levels of arrays of memory cells having an active area disposed above a silicon substrate. Alternatively, the memory 104 may have another configuration, such as a two-dimensional (2D) memory configuration or a non-monolithic 3D memory configuration (e.g., a stacked die 3D memory configuration).

The memory 104 includes one or more regions of storage elements. An example of a storage region is a block, such as a NAND flash erase group of storage elements, or a group of resistance-based storage elements in a ReRAM implementation. Another example of a storage region is a word line of storage elements (e.g., a word line of NAND flash storage elements or a word line of resistance-based storage elements). A storage region may have a single-level-cell (SLC) configuration, a multi-level-cell (MLC) configuration, or a tri-level-cell (TLC) configuration, as illustrative examples. Each storage element of the memory 104 may be programmable to a state (e.g., a threshold voltage in a flash configuration or a resistive state in a resistive memory configuration) that indicates one or more values. As an example, in an illustrative TLC scheme, a storage element may be programmable to a state that indicates three values. As an additional example, in an illustrative MLC scheme, a storage element may be programmable to a state that indicates two values.

The controller 130 includes a memory interface 132 to the memory device 103 and further includes a device interface 172 to the device 180. In an illustrative example, the memory interface 132 includes a first set of buffers, and the device interface 172 includes a second set of buffers. The controller 130 also includes a command queue 134, an error correcting code (ECC) engine 140, and a pipeline scheduler 150.

The ECC engine 140 may include one or more encoders, one or more decoders, or a combination of both. To illustrate, the example of FIG. 1 depicts that the ECC engine 140 includes a first decoder 142 and a second decoder 144. In other examples, the ECC engine 140 may include a different number of decoders (e.g., one decoder, three decoders, or another number of decoders). FIG. 1 also illustrates that the ECC engine 140 may include a syndrome weight generator circuit 146 and a bit flipping circuit 148.

The ECC engine 140 configured to encode data to generate one or more error correcting code (ECC) codewords using one or more ECC encoding techniques. For example, the ECC engine 140 may include a Reed-Solomon (RS) encoder, a Bose-Chaudhuri-Hocquenghem (BCH) encoder, a low-density parity check (LDPC) encoder, a turbo encoder, an encoder configured to encode data according to one or more other ECC techniques, or a combination thereof.

The ECC engine 140 is configured to decode data read from the memory 104 to detect and correct, up to an error correction capability of the ECC scheme, one or more bit errors that may be present in the data. One or both of the decoders 142, 144 may correspond to an RS decoder, a BCH decoder, an LDPC decoder, a turbo decoder, a decoder configured to decode data according to one or more other ECC techniques, or a combination thereof. The first decoder 142 may be configured to decode data that includes hard bits, soft bits, or a combination thereof. The second decoder 144 may be configured to decode data that includes hard bits, soft bits, or a combination thereof.

The controller 130 further includes a circuit (e.g., a pipeline delay prediction circuit 152) that is coupled to the ECC engine 140. For example, the pipeline delay prediction circuit 152 may be coupled to one or more of the first decoder 142, the second decoder 144, the syndrome weight generator circuit 146, or the bit flipping circuit 148. The pipeline delay prediction circuit 152 may include one or more of a timer circuit 154, a comparator circuit 160, or a comparator circuit 166.

During operation, the controller 130 may receive data 174 from the device 180, such as in connection with a request for write access to the memory 104. The controller 130 may encode the data 174 to generate encoded data, such as data 106. The data 106 may include one or more pages, such as a first page 108 (e.g., a first ECC codeword, flash management unit (FMU), or ECC page) and a second page 110 (e.g., a second ECC codeword, FMU, or ECC page).

The controller 130 is configured to send the data 106 to the memory device 103. The memory device 103 may store the data 106 to a particular region of the memory 104.

The controller 130 may access the data 106 from the memory 104. As an illustrative example, the controller 130 may receive a request for read access to data that includes the first page 108. The controller 130 may send a read command to the memory device 103 to initiate reading of the first page 108. In response to the read command, the memory device 103 may sense the first page 108 using the read/write circuitry 116 to generate sensed data, such as a first representation 124 of the first page 108. The first representation 124 may differ from the first page 108 due to one or more errors. Depending on the particular implementation, the first representation 124 may include a set of hard bits representing the first page 108, a set of soft bits representing the first page 108, or both.

The memory device 103 may provide the first representation 124 of the first page 108 to the controller 130. The controller 130 is configured to receive the first representation 124 from the memory device 103. For example, the memory interface 132 may include one or more buffers configured to buffer the first representation 124.

After buffering the first representation 124, the controller 130 may be configured to process the first representation 124. For example, the ECC engine 140 is configured to decode data using a decode operation (e.g., by decoding the first representation 124 to generate decoded data). In some implementations, the syndrome weight generator circuit 146 may determine a syndrome weight 162 associated with the first representation 124 prior to or in connection with decoding of the first representation 124. Alternatively or in addition, the bit flipping circuit 148 may flip one or more bits of the first representation 124 prior to or in connection with decoding of the first representation 124. For example, the bit flipping circuit 148 may include a decoder configured to attempt to decode the first representation 124 by flipping one or more bits of the first representation 124 (e.g., based on the syndrome weight 162). If decoding using the bit flipping circuit 148 fails, the ECC engine 140 may input the first representation 124 to the first decoder 142 (e.g., to initiate a "full" decode operation).

The ECC engine 140 may be configured to perform a decode operation using the bit flipping circuit 148, the first decoder 142, the second decoder 144, another decoder, or a combination thereof. In an illustrative example, the first decoder 142 is associated with a first error correction capability, and the second decoder 144 is associated with a second error correction capability that is greater than the first error correction capability. In this case, the ECC engine 140 may attempt to decode the first representation 124 using the first decoder 142. If decoding the first representation 124 using the first decoder 142 fails to converge (e.g., times out), the ECC engine 140 may initiate a decoding mode change during the decoding operation from decoding the first representation 124 using the first decoder 142 to decoding the first representation 124 using the second decoder 144.

Upon decoding data (e.g., the first representation 124) to generate decoded data, the controller 130 may provide the decoded data to the device 180 (e.g., via the device interface 172). For example, the device interface 172 may include one or more buffers configured to buffer the decoded data for retrieval by the device 180.

Certain components of the data storage device 102 may function as a pipeline during retrieval and processing of data, such as the first representation 124. As an illustrative example, a first stage of the pipeline may correspond to a set of buffers of the memory interface 132, a second stage of the pipeline may correspond to the ECC engine 140, and a third stage of the pipeline may correspond to a set of buffers of the device interface 172. The pipeline scheduler 150 may be configured to initiate tasks (e.g., a first task 136 and a second task 138) indicated by the command queue 134 to keep the pipeline "full" of data to be sent to the device 180. As an illustrative example, the pipeline scheduler 150 may be configured to initiate a task indicated by the command queue 134 each time data "passes through" (or "clears") a particular stage of the pipeline.

In some cases, a delay at a particular stage of the pipeline may cause a "bubble" in the pipeline. To illustrate, if a particular decoding process performed by the ECC engine 140 is delayed (e.g., due to a relatively large number of errors in data), each stage of the pipeline may "stall." In some cases, variation between physical characteristics of memory dies of the memory device 103 (also referred to as "die-to-die variation") may cause certain data to include a relatively large number of errors, resulting in pipeline stalls in some circumstances. Pipeline stalls increase latency of read operations and decrease throughput at the data storage device 102.

The pipeline delay prediction circuit 152 is configured to predict a pipeline delay at the data storage device 102. In a particular example, the pipeline delay prediction circuit 152 is configured detect an event that indicates a pipeline delay associated with a decode operation to decode the first representation 124 of the first page 108. Certain aspects of pipeline delay detection are described below for illustration. Depending on the particular implementation, such aspects may be used in conjunction or separately. Alternatively or in addition, one or more other aspects may be used to predict a pipeline delay.

In accordance with a first example, the timer circuit 154 is configured to monitor a duration 156 of a decode operation to decode data, such as the first representation 124. The timer circuit 154 may be configured to detect whether the duration 156 satisfies a threshold 158 (e.g., whether the duration 156 is greater than the threshold 158). If the duration 156 satisfies the threshold 158, the pipeline delay prediction circuit 152 may predict (or detect) a pipeline delay at the data storage device 102.

Alternatively or in addition to the first example, in a second example, the comparator circuit 160 is configured to access the syndrome weight 162 in connection with a decode operation to decode data, such as the first representation 124. The comparator circuit 160 may be configured to detect whether the syndrome weight 162 satisfies a threshold 164 (e.g., whether the syndrome weight 162 is greater than the threshold 164). If the syndrome weight 162 satisfies the threshold 164, the pipeline delay prediction circuit 152 may predict (or detect) a pipeline delay at the data storage device 102.

Alternatively or in addition to the first example and the second example, in a third example, the comparator circuit 166 is configured to detect a number of one or more flipped bits 168 adjusted by the bit flipping circuit 148 in connection with a decode operation to decode data, such as the first representation 124. The comparator circuit 166 may be configured to detect whether the number of one or more flipped bits 168 satisfies a threshold 170 (e.g., whether the number of one or more flipped bits 168 is greater than the threshold 170). If the number of one or more flipped bits 168 satisfies the threshold 170, the pipeline delay prediction circuit 152 may predict (or detect) a pipeline delay at the data storage device 102.

Alternatively or in addition to the first example, the second example, and the third example, in a fourth example, the pipeline delay prediction circuit 152 is configured to detect a decoding mode change performed by the ECC engine 140 during a decode operation. For example, the pipeline delay prediction circuit 152 may be configured to detect a decoding mode change during the decode operation from decoding the first representation 124 using the first decoder 142 to decoding the data using the second decoder 144. The pipeline delay prediction circuit 152 may be configured to predict (or detect) a pipeline delay at the data storage device 102 based on the decoding mode change.

In response to predicting or detecting a pipeline delay at the data storage device 102, the pipeline delay prediction circuit 152 may be configured to cause the controller 130 to send a command 120 to the memory device 103. For example, the memory interface 132 is configured to provide the command 120 to the memory device 103. The command 120 indicates to perform a read operation at the memory 104 using a particular read technique in response to the pipeline delay (e.g., to compensate for the pipeline delay). For example, the command 120 may include an opcode 122 specifying one or more of a physical address of the memory 104 to be read, the particular read technique to be used to read the one or more physical addresses, other information, or a combination thereof.

To illustrate, the read operation may include re-sensing the first page 108 to generate a second representation 126 of the first page 108 in response to predicting the pipeline delay. In this example, the opcode 122 may include an address associated with the first page 108. In some examples, the first representation 124 includes a set of hard bits, and the second representation 126 includes a set of soft bits. Alternatively or in addition, the first representation 124 may include a first number of soft bits, and the second representation 126 may include a second number of soft bits greater than the first number of soft bits. In an illustrative example, the second representation 126 is generated during decoding of the first representation 124 by the ECC engine 140.

In some implementations, a soft bit re-sensing of the first page 108 is initiated in response to terminating a decode operation to decode hard bits of the first representation 124 of the first page 108. For example, in response to detecting (e.g., based on a bit error rate (BER) associated with the first representation 124) that the decode operation is likely to fail, the decode operation may be terminated (e.g., to conserve power at the data storage device 102), and the command 120 may be issued to initiate soft bit re-sensing of the first page 108 to generate the second representation 126 of the first page 108.

Alternatively or in addition to re-sensing the first page 108 to generate the second representation 126, the data storage device 102 may perform a read look-ahead operation to generate a representation 128 of the second page 110 in response to detecting the pipeline delay. For example, the controller 130 may access the command queue 134 to determine a task to be performed after decoding of the first representation 124, such as by identifying that the second task 138 is associated with the second page 110. In this case, the controller 130 may "accelerate" execution of the second task 138 by issuing the command 120 in response to the pipeline delay, such as by initiating a soft bit read of the second page 110 in response to the pipeline delay. For example, in some cases, if the first page 108 includes a relatively large number of errors, the second page 110 may be likely to include a relatively large number of errors (e.g., due to being stored in a common memory die, block, or word line). In this example, initiating a soft bit read to generate the representation 128 in response to the pipeline delay may reduce a duration associated with decoding of the representation 128.

In some implementations, the controller 130 is configured to identify one or more tasks of the command queue 134 that are associated with (or "allocated to") a same time tag as the first page 108. An example of a time tag is an indication of a status (e.g., a health status) of a region of the memory 104 storing a page, such as the first page 108. In some circumstances, pages associated with a common time tag may be likely to exhibit a common BER (e.g., due to similar amounts of physical wear to storage elements storing the pages). In some cases, if the first page 108 includes a relatively large number of errors, the second page 110 may be likely to include a relatively large number of errors (e.g., due to the pages 108, 110 being associated with a common time tag). In this example, initiating a soft bit read to generate the representation 128 in response to the pipeline delay may reduce a duration associated with decoding of the representation 128.

In other cases, the controller 130 may speculatively identify the second page 110 (e.g., independently of tasks indicated by the command queue 134). For example, the controller 130 may determine that the second page 110 is likely to be requested by the device 180 based on a pattern of logical addresses indicated by the device 180. The opcode 122 may indicate an address associated with the second page 110. In an illustrative example, the representation 128 is generated during decoding of the first representation 124 by the ECC engine 140.

In some implementations, the controller 130 is configured to set an address indicated by the opcode 122 based on a probability of successfully decoding the first representation 124. To illustrate, if the controller 130 determines (e.g., based on the syndrome weight 162) that the decode operation is likely to succeed, the controller 130 may set the opcode 122 to indicate an address of the second page 110 (alternatively or in addition to indicating the first page 108). As another example, if the controller 130 determines (e.g., based on the syndrome weight 162) that the decode operation is likely to fail, the controller 130 may set the opcode 122 to indicate an address of the first page 108 (alternatively or in addition to indicating the second page 110).

Alternatively or in addition to indicating one or more addresses, the command 120 may indicate one or more read techniques. A particular read technique indicated by the command 120 may be different than a read technique used to generate the first representation 124. To illustrate, the particular read technique may correspond to a type of sensing operation, such as a soft bit sensing operation. Alternatively or in addition, the particular read technique may correspond to a number of soft bits used to represent data that is stored at the memory 104. The opcode 122 may indicate the particular read technique.

Alternatively or in addition to indicating an address or a particular read technique, the command 120 may indicate another memory operation. As an example, the opcode 122 may indicate that a read threshold calibration operation is to be performed at the memory 104 to determine read thresholds 118. In some cases, the first representation 124 may include a relatively large number of errors due to a particular condition (e.g., one or more of a temperature change or a voltage fluctuation at the data storage device 102), and performing the read threshold calibration operation may recalibrate the read thresholds 118 to compensate for the particular condition. An example of a read threshold calibration operation is a cell voltage distribution (CVD) tracking operation.

After executing the command 120, the data storage device 102 may continue operation. For example, if decoding of the first representation 124 has not converged to a valid result after executing the command 120, the controller 130 may input the second representation 126 to the ECC engine 140 (e.g., to "assist" in decoding the first representation 124). Alternatively or in addition, the data storage device 102 may input the representation 128 of the second page 110 to a particular pipeline stage, such as at one or more buffers of the memory interface 132 while decoding of the first representation 124 is completed, as an illustrative example. Alternatively or in addition, another read operation at the memory may be performed (e.g., using the read thresholds 118), or the data storage device 102 may perform another operation.

One or more aspects described with reference to FIG. 1 may increase throughput at the data storage device 102. For example, by sending the command 120 to initiate a memory operation in response to predicting a pipeline delay at the data storage device 102, throughput may be increased as compared to waiting until completion (or failure) of a decode operation to initiate the memory operation.

Figure 2:
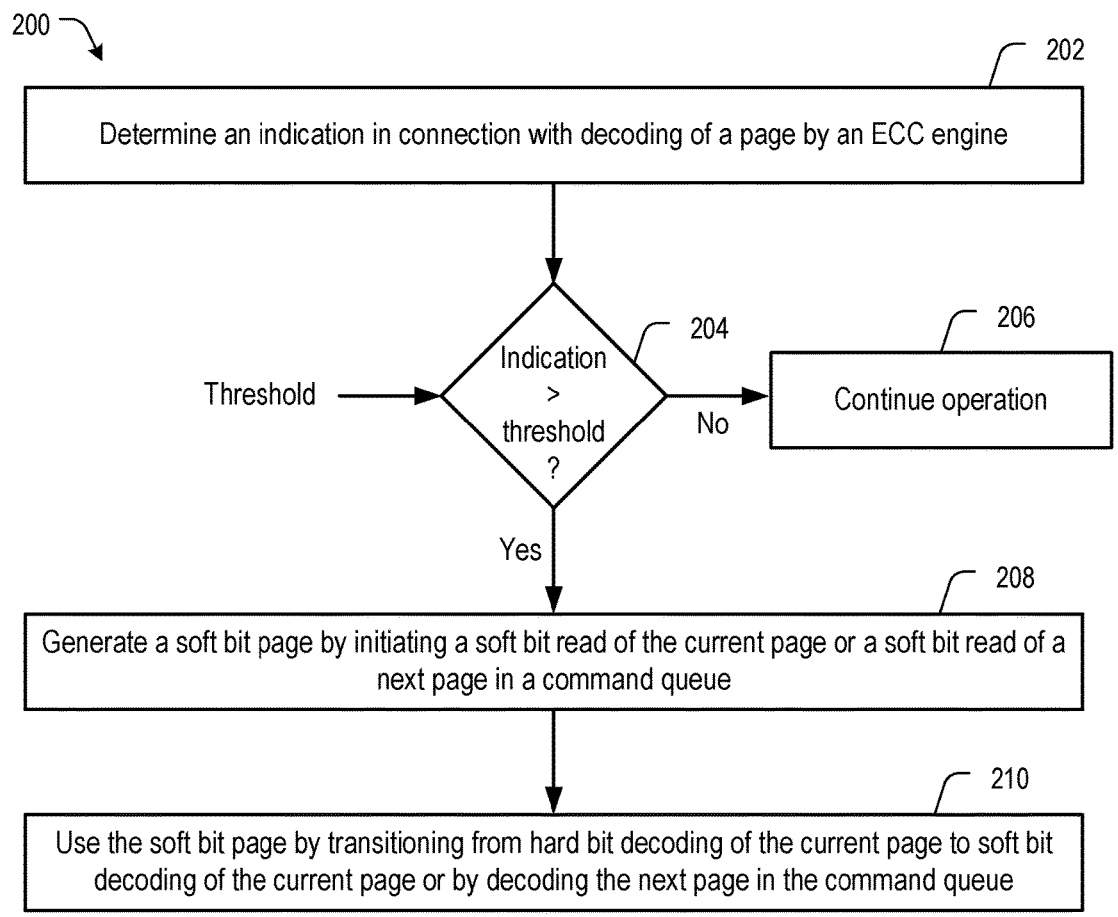
FIG. 2 is a flow chart of a particular illustrative example of a method of operation of the data storage device of FIG. 1.

FIG. 2 depicts a method 200 of operation of a data storage device. For example, the method 200 may be performed by the data storage device 102 of FIG. 1.

The method 200 includes determining an indication in connection with decoding of a page by an ECC engine, at 202. For example, the pipeline delay prediction circuit 152 of FIG. 1 may detect the indication during decoding of the first representation 124 of the first page 108 by the ECC engine 140. The indication may correspond to the duration 156, the syndrome weight 162, the number of one or more flipped bits 168, a decoding mode used by the ECC engine 140, one or more other criteria, or a combination thereof.

The method 200 further includes determining whether the indication satisfies a threshold, at 204. For example, the pipeline delay prediction circuit 152 may determine whether the duration 156 satisfies the threshold 158, whether the syndrome weight 162 satisfies the threshold 164, whether the number of one or more flipped bits 168 satisfies the threshold 170, whether a decoding mode used by the ECC engine 140 satisfies a threshold, or a combination thereof.

If the indication fails to satisfy the threshold, the method 200 may continue, at 206. If the indication satisfies the threshold, the method 200 may further include generating a soft bit page by initiating a soft bit read of the current page or a soft bit read of a next page in a command queue, at 208. For example, the soft bit read may be performed to generate the second representation 126 of the first page 108. Alternatively or in addition, the command queue 134 of FIG. 1 may indicate the second page 110, and the soft bit read may be performed to generate the representation 128 of the second page 110. The soft bit read may be performed in response to selecting from the command queue 134 a task associated with a common time tag as the current page.

The method 200 further includes using the soft bit page by transitioning from hard bit decoding of the current page to soft bit decoding of the current page or by decoding the next page in the command queue, at 210. For example, the second representation 126 may be input to the ECC engine 140 of FIG. 1 to accelerate decoding of the first page 108. Alternatively or in addition, the representation 128 may be input to the ECC engine 140 to decode the second page 110.

One or more aspects described with reference to the method 200 of FIG. 2 may increase throughput at a data storage device, such as the data storage device 102 of FIG. 1. For example, by initiating the soft bit read in response to detecting that an indication determined during decoding of a page satisfies a threshold, throughput may be increased as compared to waiting until completion (or failure) of decoding of the page.

Figure 3:
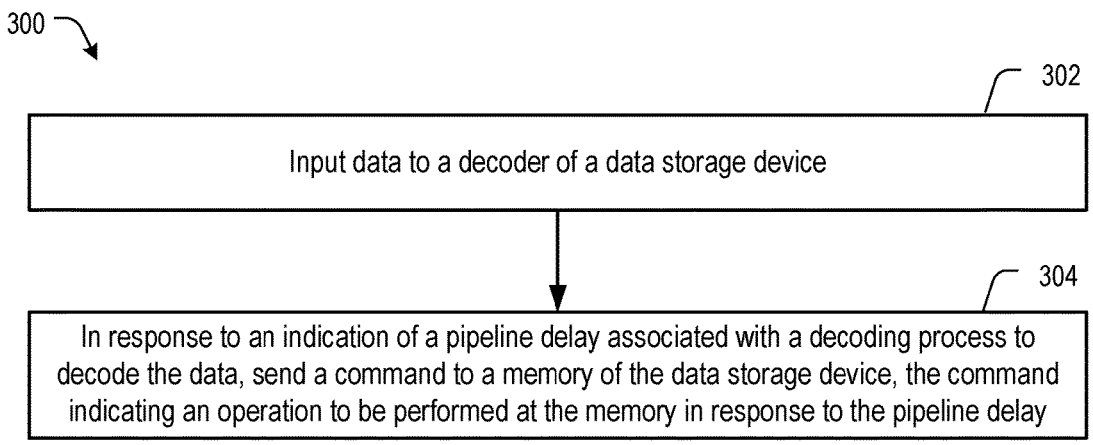
FIG. 3 is a flow chart of a particular illustrative example of another method of operation of the data storage device of FIG. 1.

FIG. 3 depicts a method 300 of operation of a data storage device that includes a decoder and a memory. For example, the method 300 may be performed by the data storage device 102 of FIG. 1.

The method 300 includes inputting data to a decoder of a data storage device, at 302. For example, the first representation 124 may be input to the first decoder 142, to the second decoder 144, or to another decoder that may be included in the ECC engine 140.

The method 300 further includes sending a command to a memory of the data storage device in response to an indication of a pipeline delay associated with a decoding process to decode the data, at 304. For example, the controller 130 may send the command 120 to the memory device 103 in response to the pipeline delay prediction circuit 152 predicting a pipeline delay at the data storage device 102.

The command 120 indicates an operation to be performed at the memory in response to the pipeline delay. In some examples, the command 120 indicates a read operation that includes re-sensing at least a first page of the data, such as the first page 108 of the data 106. Alternatively or in addition, the command 120 may indicate a read look-ahead operation to read a second page (e.g., the second page 110) that is different than the first page. Alternatively or in addition, the command 120 may indicate a particular read technique, such as a soft bit read technique. Alternatively or in addition, the command 120 may indicate a read threshold calibration operation (e.g., to determine the read thresholds 118).

In some examples, the pipeline delay may be predicted based on the duration 156 of the decoding process satisfying the threshold 158. Alternatively or in addition, the method 300 may include determining the syndrome weight 162 of the data, and the pipeline delay may be predicted based on the syndrome weight 162 satisfying the threshold 158. Alternatively in addition, the method 300 may include flipping one or more bits of the data prior to initiating the decoding process, the pipeline delay may be predicted based on the number of the one or more flipped bits 168 satisfying the threshold 164. Alternatively or in addition, the method 300 may include performing a decoding mode change during the decoding process, and the pipeline delay may be predicted based on the decoding mode change. For example, the decoding mode change may include a change from decoding the data using the first decoder 142 to decoding the data using the second decoder 144.

One or more aspects described with reference to the method 300 of FIG. 3 may increase throughput at a data storage device, such as the data storage device 102 of FIG. 1. For example, by sending the command 120 to initiate a memory operation in response to predicting a pipeline delay at the data storage device 102, throughput may be increased as compared to waiting until completion (or failure) of a decode operation to initiate the memory operation.

Figure 4:
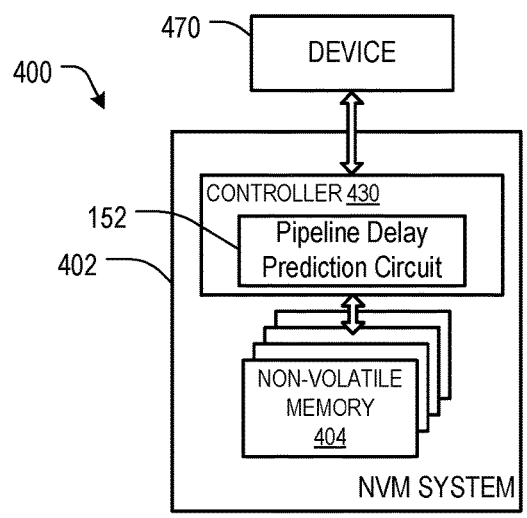
FIG. 4 is a block diagram of a particular illustrative example of a non-volatile memory system that includes a data storage device, such as the data storage device of FIG. 1.

Referring to FIG. 4, a system 400 includes a non-volatile memory system 402 (e.g., the data storage device 102) that may be coupled to a device 470 (e.g., the device 180). The non-volatile memory system 402 includes a controller 430 (e.g., the controller 130) and non-volatile memory that may be made up of one or more non-volatile memory dies 404 (e.g., one or more memory dies included in the memory device 103). As used herein, the term "memory die" refers to the collection of non-volatile memory cells, and associated circuitry for managing the physical operation of those non-volatile memory cells, that are formed on a single semiconductor substrate. The controller 430 interfaces with the device 470 and transmits command sequences for read, program, and erase operations to the one or more non-volatile memory dies 404.

The controller 430 includes the pipeline delay prediction circuit 152. The controller 430 (which may be a flash memory controller) may take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 430 may be configured with hardware and/or firmware to perform the various functions described below and shown in the flow diagrams. Also, some of the components shown as being internal to the controller 430 can be stored external to the controller 430, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory, map out bad flash memory cells, and allocate spare cells to be substituted for future failed cells. Some part of the spare cells can be used to hold firmware to operate the flash memory controller and implement other features. In operation, when a host device is to read data from or write data to the flash memory, the host device communicates with the flash memory controller. If the host device provides a logical address to which data is to be read/written, the flash memory controller can convert the logical address received from the host device to a physical address in the flash memory. (Alternatively, the host device can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The one or more non-volatile memory dies 404 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between the controller 430 and the one or more non-volatile memory dies 404 may be any suitable flash interface, such as Toggle Mode 200, 400, or 800. In one embodiment, the non-volatile memory system 402 may be a card based system, such as a secure digital (SD) or a micro secure digital (micro-SD) card. In an alternate embodiment, the non-volatile memory system 402 may be part of an embedded memory system.

Although, in the example illustrated in FIG. 4, the non-volatile memory system 402 (sometimes referred to herein as a storage module) includes a single channel between the controller 430 and the one or more non-volatile memory dies 404, the subject matter described herein is not limited to having a single memory channel. For example, in some NAND memory system architectures (such as the ones shown in FIGS. 5 and 6), 2, 4, 8 or more NAND channels may exist between the controller 430 and the NAND memory device, depending on controller capabilities. In any of the embodiments described herein, more than a single channel may exist between the controller 430 and the one or more non-volatile memory dies 404, even if a single channel is shown in the drawings.

Figure 5:
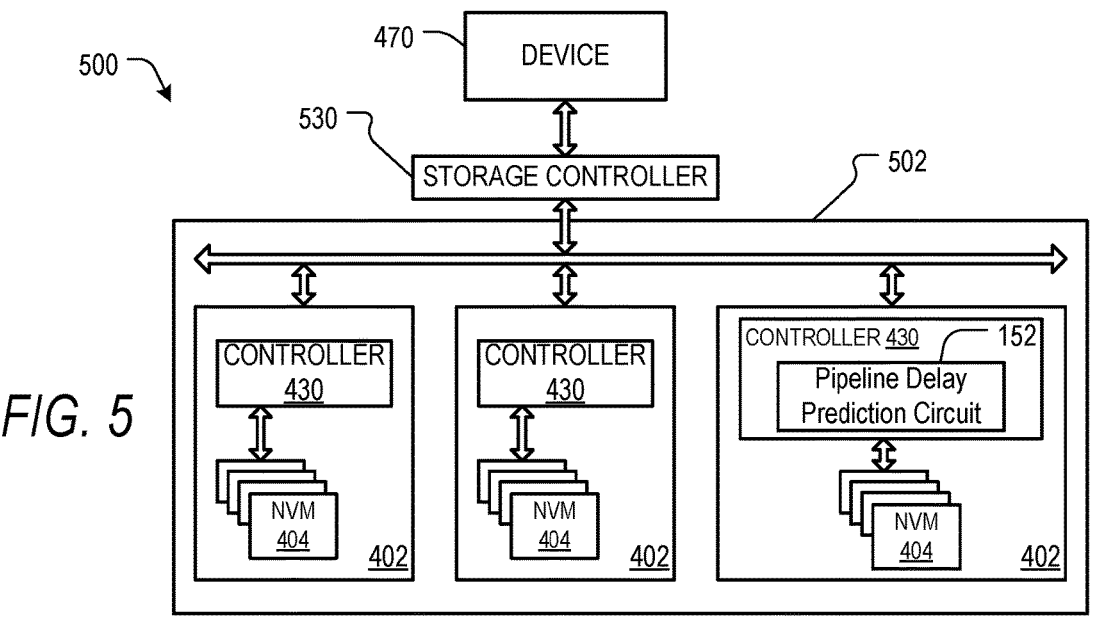
FIG. 5 is a block diagram of a particular illustrative example of a storage system including a plurality of the non-volatile memory systems of FIG. 4.

FIG. 5 illustrates a storage system 500 that includes multiple non-volatile memory systems 402. As such, storage system 500 may include a storage controller 530 that interfaces with the device 470 (e.g., a host device) and with a storage system 502, which includes a plurality of non-volatile memory systems 402. The interface between the storage controller 530 and the non-volatile memory systems 402 may be a bus interface, such as a serial advanced technology attachment (SATA) or peripheral component interface express (PCIe) interface. The storage system 500 may correspond to a solid state drive (SSD), such as found in portable computing devices, such as laptop computers, and tablet computers. One or more of the controllers 430 of FIG. 4 may include the pipeline delay prediction circuit 152. Alternatively or in addition, storage controller 530 may include the pipeline delay prediction circuit 152.

Figure 6:
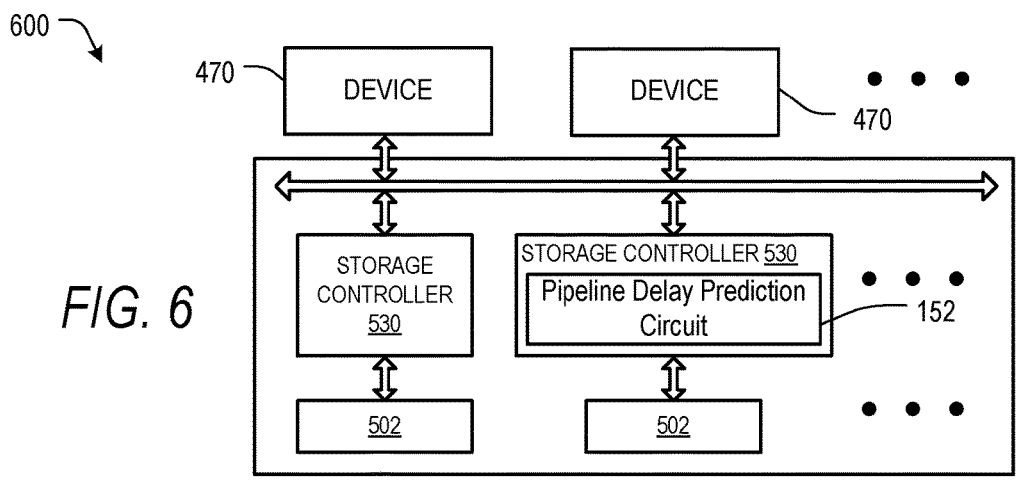
FIG. 6 is a block diagram of a particular illustrative example of a hierarchical storage system that includes a plurality of the storage systems of FIG. 5.

FIG. 6 is a block diagram illustrating a hierarchical storage system 600. The hierarchical storage system 600 includes a plurality of storage controllers 530, each of which controls a respective storage system 502. Devices 470 (e.g., one or more host devices or accessing devices) may access memories within the hierarchical storage system 600 via a bus interface. In one embodiment, the bus interface may be an NVMe or fiber channel over Ethernet (FCoE) interface. In one embodiment, the hierarchical storage system 600 illustrated in FIG. 6 may be a rack mountable mass storage system that is accessible by multiple host computers, such as would be found in a data center or other location where mass storage is needed. One or more storage controllers 530 of FIG. 6 may include the pipeline delay prediction circuit 152.

Figure 7:
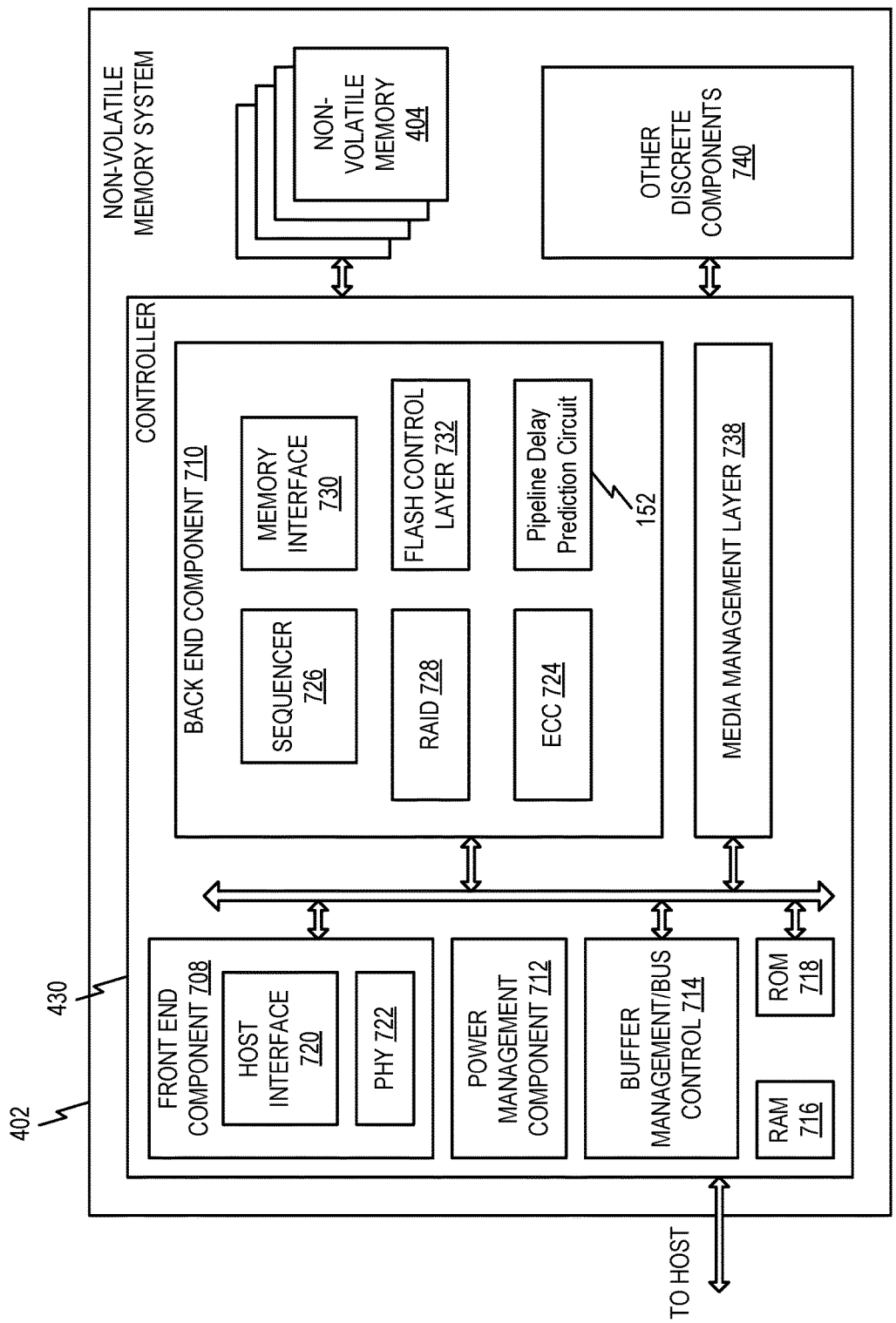
FIG. 7 is a block diagram of a memory system and depicts components of a particular illustrative example of a controller of the non-volatile memory system of FIG. 4.

FIG. 7 is a block diagram illustrating exemplary components of the controller 430 of the non-volatile memory system 402 in more detail. The controller 430 may include the pipeline delay prediction circuit 152. The controller 430 also includes a front end component 708 that interfaces with a host device, a back end component 710 that interfaces with the one or more non-volatile memory dies 404, and various other modules that perform other functions. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to the controller 430, a buffer manager/bus controller 714 manages buffers in random access memory (RAM) 716 and controls the internal bus arbitration of the controller 430. A read only memory (ROM) 718 stores system boot code. Although illustrated in FIG. 7 as located within the controller 430, in other embodiments one or both of the RAM 716 and the ROM 718 may be located externally to the controller 430. In yet other embodiments, portions of RAM and ROM may be located both within the controller 430 and outside the controller 430.

Front end component 708 includes a host interface 720 and a physical layer interface (PHY) 722 that provide the electrical interface with the host device or next level storage controller. In an illustrative example, the host interface 720 and the PHY 722 correspond to or are included in the device interface 172 of FIG. 1. The choice of the type of host interface 720 can depend on the type of memory being used. Examples of host interfaces 720 include, but are not limited to, SATA, SATA Express, SAS, Fibre Channel, USB, PCIe, and NVMe. The host interface 720 typically facilitates transfer for data, control signals, and timing signals.

Back end component 710 includes an ECC engine 724 (e.g., the ECC engine 140 of FIG. 1) that encodes the data received from the host device, and decodes and error corrects the data read from the non-volatile memory. A command sequencer 726 generates command sequences, such as program and erase command sequences, to be transmitted to the one or more non-volatile memory dies 404. A RAID (Redundant Array of Independent Drives) component 728 manages generation of RAID parity and recovery of failed data. The RAID parity may be used as an additional level of integrity protection for the data being written into the one or more non-volatile memory dies 404. In some cases, the RAID component 728 may be a part of the ECC engine 724. A memory interface 730 provides the command sequences to non-volatile memory die 404 and receives status information from the one or more non-volatile memory dies 404. For example, the memory interface 730 may be a double data rate (DDR) interface, such as a Toggle Mode 200, 400, or 800 interface. A flash control layer 732 controls the overall operation of back end component 710.

Additional components of the non-volatile memory system 402 illustrated in FIG. 7 include a power management component 712 and a media management layer 738, which performs wear leveling of memory cells of the one or more non-volatile memory dies 404. Non-volatile memory system 402 also includes other discrete components 740, such as external electrical interfaces, external RAM, resistors, capacitors, or other components that may interface with the controller 430. In alternative embodiments, one or more of the physical layer interface 722, RAID component 728, media management layer 738 and buffer management/bus controller 714 are optional components that are omitted from the controller 430.

Figure 8:
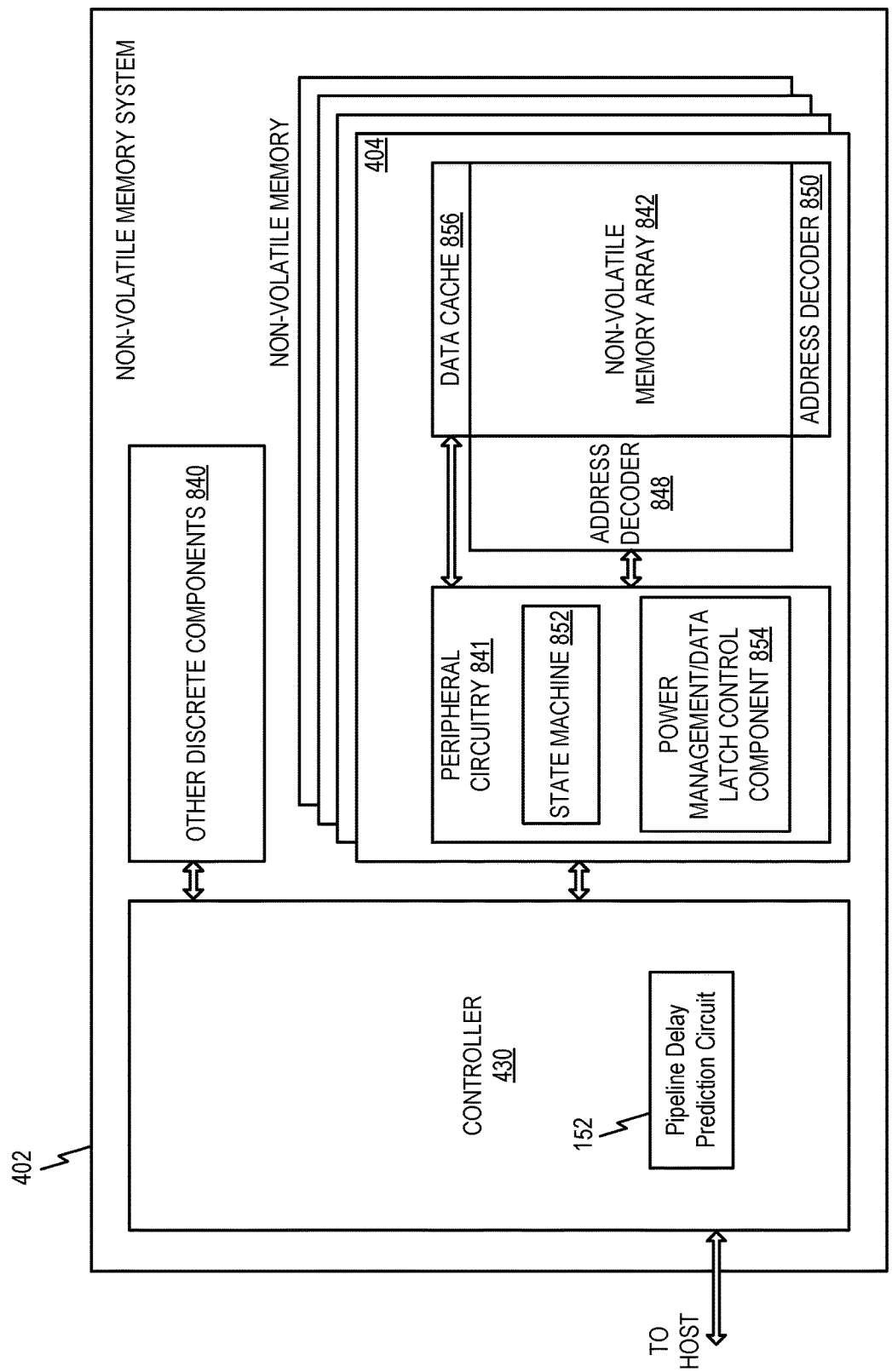
FIG. 8 is a block diagram of a memory system and depicts components of a particular illustrative example of a non-volatile memory die of the non-volatile memory system of FIG. 4.

FIG. 8 is a block diagram illustrating exemplary components of the one or more non-volatile memory dies 404 of the non-volatile memory system 402 in more detail. The one or more non-volatile memory dies 404 include peripheral circuitry 841 and a non-volatile memory array 842. The non-volatile memory array 842 includes the non-volatile memory cells used to store data. The non-volatile memory cells may be any suitable non-volatile memory cells, including NAND flash memory cells and/or NOR flash memory cells in a two dimensional and/or three dimensional configuration. The peripheral circuitry 841 includes a state machine 852 that provides status information to the controller 430. The peripheral circuitry 841 may also include a power management or data latch control component 854. The one or more non-volatile memory dies 404 further include discrete components 840, an address decoder 848, an address decoder 850, and a data cache 856 that caches data. FIG. 8 also illustrates that the controller 430 may include the pipeline delay prediction circuit 152.

In conjunction with the described embodiments, an apparatus includes means (e.g., the decoder 142 or the decoder 144) for decoding data (e.g., the first representation 124 of the first page 108). The apparatus further includes means (e.g., the pipeline delay prediction circuit 152) for predicting a pipeline delay associated with decoding of the data. The apparatus further includes means (e.g., the memory interface 132) for sending a command (e.g., the command 120) to a memory (e.g., the memory 104). The command indicates a read operation to be performed at the memory using a particular read technique to compensate for the pipeline delay. The apparatus may further include means (e.g., the read/write circuitry 116) for performing the read operation at the memory based on the command.

Although various components depicted herein are illustrated as block components and described in general terms, such components may include one or more microprocessors, state machines, or other circuits configured to enable such components to perform one or more operations described herein. For example, certain aspects of the pipeline delay prediction circuit 152 may represent physical components, such as hardware controllers, state machines, logic circuits, or other structures, to enable the controller 130 to detect a pipeline delay.

Alternatively or in addition, certain aspects of the pipeline delay prediction circuit 152 may be implemented using a microprocessor or microcontroller. In a particular embodiment, one or more aspects of the pipeline delay prediction circuit 152 may be implemented using a processor executing instructions (e.g., firmware) that are stored at the memory 104. Alternatively, or in addition, executable instructions that are executed by the processor may be stored at a separate memory location that is not part of the memory 104, such as at a read-only memory (ROM) that may be included in the controller 130.

The data storage device 102 may be coupled to, attached to, or embedded within one or more accessing devices, such as within a housing of the device 180. For example, the data storage device 102 may be embedded within the device 180 in accordance with a Joint Electron Devices Engineering Council (JEDEC) Solid State Technology Association Universal Flash Storage (UFS) configuration. To further illustrate, the data storage device 102 may be integrated within an electronic device (e.g., the device 180), such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory.

In one or more other implementations, the data storage device 102 may be implemented in a portable device configured to be selectively coupled to one or more external devices, such as a host device. For example, the data storage device 102 may be removable from the device 180 (i.e., "removably" coupled to the device 180). As an example, the data storage device 102 may be removably coupled to the device 180 in accordance with a removable universal serial bus (USB) configuration.

The device 180 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The device 180 may communicate via a controller, which may enable the device 180 to communicate with the data storage device 102. The device 180 may operate in compliance with a JEDEC Solid State Technology Association industry specification, such as an embedded MultiMedia Card (eMMC) specification or a Universal Flash Storage (UFS) Host Controller Interface specification. The device 180 may operate in compliance with one or more other specifications, such as a Secure Digital (SD) Host Controller specification as an illustrative example. Alternatively, the device 180 may communicate with the data storage device 102 in accordance with another communication protocol. In some implementations, the data storage device 102 may be integrated within a network-accessible data storage system, such as an enterprise data system, an NAS system, or a cloud data storage system, as illustrative examples.

In some implementations, the data storage device 102 may include a solid state drive (SSD). The data storage device 102 may function as an embedded storage drive (e.g., an embedded SSD drive of a mobile device), an enterprise storage drive (ESD), a cloud storage device, a network-attached storage (NAS) device, or a client storage device, as illustrative, non-limiting examples. In some implementations, the data storage device 102 may be coupled to the device 180 via a network. For example, the network may include a data center storage system network, an enterprise storage system network, a storage area network, a cloud storage network, a local area network (LAN), a wide area network (WAN), the Internet, and/or another network.

To further illustrate, the data storage device 102 may be configured to be coupled to the device 180 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The memory 104 may include a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), another type of memory, or a combination thereof. The memory 104 may include a semiconductor memory device.

Semiconductor memory devices include volatile memory devices, such as dynamic random access memory ("DRAM") or static random access memory ("SRAM")

devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where they direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of operation of a data storage device that includes a controller and a memory device, the method comprising:
    inputting data to a decoder of the controller;
    determining, with the controller, a characteristic associated with the data;
    generating, with the controller, an indication of a pipeline delay associated with a decoding process to decode the data in response to determining that the characteristic associated with the data satisfies a characteristic threshold; and
    controlling, with the controller, a memory interface of the controller to send a command to the memory device in response to the indication of the pipeline delay associated with the decoding process to decode the data, the command indicating an operation to be performed at the memory device in response to the pipeline delay.

2. The method of claim 1, wherein the command indicates a read operation that includes re-sensing at least a first page of the data.

3. The method of claim 1, wherein the data includes a first page, and wherein the command indicates a read look-ahead operation to read a second page that is different than the first page.

4. The method of claim 1, wherein the command indicates a soft bit read technique.

5. The method of claim 1, wherein the command indicates a read threshold calibration operation.

6. The method of claim 1, wherein determining the characteristic includes determining a syndrome weight associated with the data, wherein the indication of the pipeline delay is generated based on the syndrome weight satisfying a syndrome weight threshold.

7. The method of claim 1, further comprising flipping one or more bits of the data prior to initiating the decoding process, wherein determining the characteristic of the data includes determining a number of one or more flipped bits of the data, and wherein the indication of the pipeline delay is generated based on the number of the one or more flipped bits satisfying a flipped bits threshold.

8. The method of claim 1, further comprising performing a decoding mode change during the decoding process, wherein the pipeline delay is predicted based on the decoding mode change.

9. The method of claim 8, wherein the decoding mode change includes a change from decoding the data using a first decoder having a first error correction capability to decoding the data using a second decoder having second error correction capability that is greater than the first error correction capability.

10. An apparatus comprising:
    an error correcting code (ECC) engine configured to decode data using a decode operation;
    a circuit coupled to the ECC engine, the circuit configured to
        determine a characteristic associated with the data, and
        generate an indication of a pipeline delay associated with the decode operation in response to determining that the characteristic associated with the data satisfies a characteristic threshold; and
    a memory interface to a memory device, the memory interface configured to provide a command to the memory device to perform a read operation using a particular read technique in response to the indication of the pipeline delay.

11. The apparatus of claim 10, further comprising a command queue storing an indication of a task to be performed after decoding of the data, wherein the read operation corresponds to the task.

12. The apparatus of claim 10, further comprising a syndrome weight generator circuit configured to determine a syndrome weight associated with the data, wherein determining the characteristic includes determining the syndrome weight, wherein the circuit includes a comparator circuit configured to determine that the syndrome weight satisfies a syndrome weight threshold, and wherein the indication of the pipeline delay is generated based on the syndrome weight satisfying the syndrome weight threshold.

13. The apparatus of claim 10, further comprising a bit flipping circuit configured to flip one or more bits of the data prior to the decode operation, wherein determining the characteristic of the data includes determining a number of one or more flipped bits of the data, wherein the circuit includes a comparator circuit configured to determine that a number of the one or more flipped bits satisfies a flipped bits threshold, and wherein the indication of the pipeline delay is generated based on the number of the one or more flipped bits satisfying the flipped bits threshold.

14. The apparatus of claim 10, wherein the ECC engine includes a first decoder associated with a first error correction capability and a second decoder associated with a second error correction capability greater than the first error correction capability.

15. The apparatus of claim 14, wherein the circuit is configured to detect a decoding mode change during the decode operation from decoding the data using the first decoder to decoding the data using the second decoder.

16. The apparatus of claim 10, wherein the command includes an opcode that indicates the particular read technique, and wherein the particular read technique is different than a read technique used to sense the data.

17. An apparatus comprising:
    means for decoding data;
    means for predicting a pipeline delay associated with decoding of the data, wherein the means for predicting the pipeline delay determines a characteristic associated with the data and generates an indication of the pipeline delay associated with a decoding process to decode the data in response to determining that the characteristic associated with the data satisfies a characteristic threshold; and
    means for sending a command to a memory device, the command indicating a read operation to be performed at the memory device using a particular read technique to compensate for the pipeline delay in response to the indication of the pipeline delay,
wherein the memory device is separate and distinct from the means for sending the command to the memory device.

18. The apparatus of claim 17, wherein the memory device further includes means for performing the read operation based on the command.

19. The apparatus of claim 17, further comprising means for determining a syndrome weight associated with the data, wherein determining the characteristic includes determining the syndrome weight, wherein the indication of the pipeline delay is generated based on the syndrome weight satisfying a syndrome weight threshold.

20. The apparatus of claim 17, further comprising means for flipping one or more bits of the data prior to the decoding the data, wherein determining the characteristic of the data includes determining a number of one or more flipped bits of the data, wherein the indication of the pipeline delay is generated based on the number of the one or more flipped bits satisfying a flipped bits threshold.

* * * * *